United States Patent [19]

George

[11] 3,721,959

[45] March 20, 1973

[54] METHOD AND MEANS FOR DETECTING ERROR RATE OF TRANSMITTED DATA

[75] Inventor: Robert A. George, Richardson, Tex.

[73] Assignee: Collins Radio Company, Dallas, Tex.

[22] Filed: Nov. 29, 1971

[21] Appl. No.: 202,958

[52] U.S. Cl..........340/146.1 AX, 307/235 R, 325/41, 328/162

[51] Int. Cl.........H04b 3/46, H03k 5/18, G08c 25/00

[58] Field of Search...................307/235 R; 328/162; 340/146.1 AX; 325/41, 321, 363

[56] References Cited

UNITED STATES PATENTS

| | | | |
|---|---|---|---|
| 3,404,232 | 10/1968 | Burford | 328/162 X |
| 3,534,273 | 10/1970 | Thomas | 328/162 |
| 3,078,443 | 2/1963 | Rose | 340/146.1 A X |

*Primary Examiner*—Malcolm A. Morrison
*Assistant Examiner*—R. Stephen Dildine, Jr.
*Attorney*—Henry K. Woodward et al.

[57] ABSTRACT

Method and means of error rate detection including developing an eye pattern analog signal of transmitted digital data, defining a region within said eye pattern as an unacceptable area through which said eye pattern may not transgress, and counting as an erroneous signal each transgression of said analog signal into said region.

9 Claims, 6 Drawing Figures

METHOD AND MEANS FOR DETECTING ERROR RATE OF TRANSMITTED DATA

This invention relates generally to electronic error detectors, and in particular to a detector for use with data transmission equipment.

In electronic data transmission the quality or reliability of the transmission system may be expressed in terms of an error rate, i.e., the number of erroneously received digital pulses per unit of time. The error rate is determined by a number of factors including intersymbol interference, noise, signal erection, fading, equipment misadjustment, and the like.

One method of monitoring the quality of a data transmission channel has been through the use of automatic gain control (AGC) in the receiver. Provision is made to switch to a diversity channel when the gain control feedback exceeds a certain limit. While the method can detect a weak or faded signal, a signal distortion due to noise is not identified. Thus, a badly distorted signal due to noise may go undetected. Another alternative employs the transmission of a known pattern of data whereby the received data can be checked for accuracy. Of course, normal transmission must be interrupted for this test.

An object of the present invention is an improved and reliable data transmission degradation detector and method of detecting data transmission degradation.

Another object of the invention is a detector which is operable during normal data transmission.

Still another object of the invention is a transmission line diversity switch including data transmission degradation detector means for switching between alternate channels when the detected error rate of one channel exceeds an established limit.

Features of the invention include a voltage comparator for comparing a transmitted digital signal "eye pattern" with high and low voltage references during a limited time period referenced to the crossover point of the eye pattern. As used herein, the "eye pattern" is the analog response to transmitted pulsed data as displayed by an oscilloscope used to sweep out the received signal when the horizontal sweep rate is equal to the pulse rate. Such an oscilloscope display is widely known in the art as an "eye pattern" due to its resemblance to the human eye for binary data. See Lucky et al., *Principles of Data Communication*, McGraw-Hill Book Company, 1968, pages 60–63.

Thus, in effect, a window is defined within the eye pattern which establishes an unacceptable area through which the eye pattern may not transgress. Counter means is provided to count the number of transgressions within a period of time for comparison with the established acceptable error rate. In the transmission line diversity switch, digital switch means is provided which is responsive to a count exceeding the established error rate for switching from one data channel to a diversity data channel.

These and other objects and features of the invention will be more readily apparent from the following detailed description and appended claims when taken with the drawings, in which:

Figure 1:
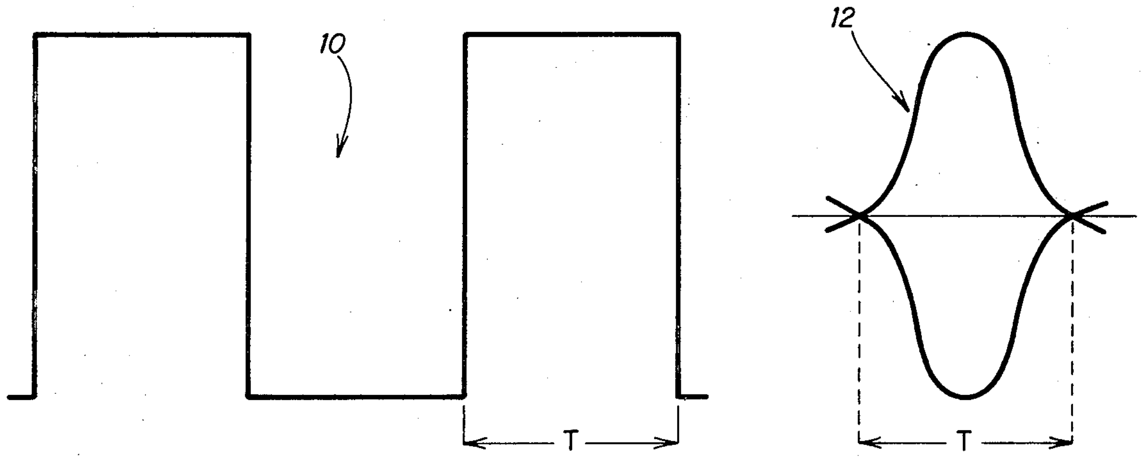
FIG. 1 is the waveform of a pulse digital signal and a corresponding eye pattern.

Referring now to the drawings, FIG. 1 illustrates a pulsed digital signal 10 as used in digital data transmission and a corresponding eye pattern 12. As recognized in the art and as discussed in *Principles of Data Communication*, supra, the eye pattern is an analog response resembling an eye as displayed on an oscilloscope in which the period of the eye pattern, T, corresponds to the time period of a pulse in the pulse signal 10. As will be described further below, when the pulse signal loses strength through attenuation, the eye pattern tends to collapse. Further, if the transmitted pulse signal contains a substantial amount of noise, this noise will be displayed on the eye pattern.

Figure 2:
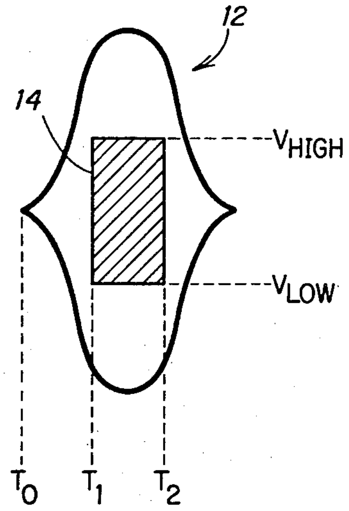
FIG. 2 is an eye pattern with a window defined therein.

Applicant's degradation detector and diversity switch in accordance with the present invention utilizes these aspects of the eye pattern in providing for error detection regardless of the nature of the signal degradation. As shown in FIG. 2, applicant defines a forbidden area or window 14 within the eye pattern 12. Should the eye pattern signal 12 for whatever reason transgress within window 14, the signal is deemed unreliable and constitutes an error. Window 14 is defined in height by a high voltage reference $V_{high}$, and a low voltage reference, $V_{low}$, which establish the voltage excursion limits for an acceptable signal. The window is further defined by the time period between time $T_1$ and time $T_2$, which are related to the eye pattern crossover point time $T_0$, whereby the window is centered within the eye pattern.

Figure 3:
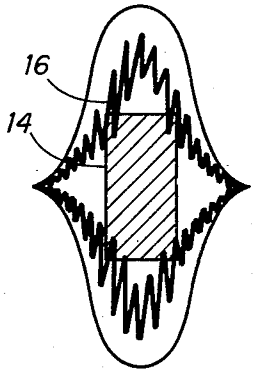
FIG. 3 is an eye pattern in which the transmitted signal includes sufficient noise whereby the signal transgresses into the window.
Figure 4:
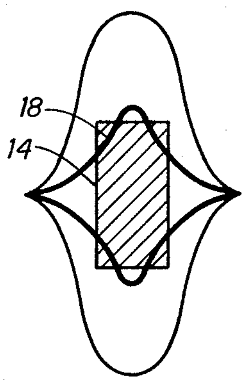
FIG. 4 is an eye pattern wherein the transmitted signal is sufficiently weak that the eye pattern transgresses into the window.

Consider now two degradation situations which may produce errors in the signal. In FIG. 3, the signal 16 has been degraded by the presence of noise, thereby driving the signal 16 within the forbidden window 14. In accordance with the present invention, the pulse at this period of time is considered in error because of its unreliability. FIG. 4 is a similar situation wherein the signal 18 transgresses the forbidden region defined by window 14 due to attenuation of the signal. In this situation, the weak signal is considered unreliable and the pulse at this period of time is designated an error.

Figure 5:
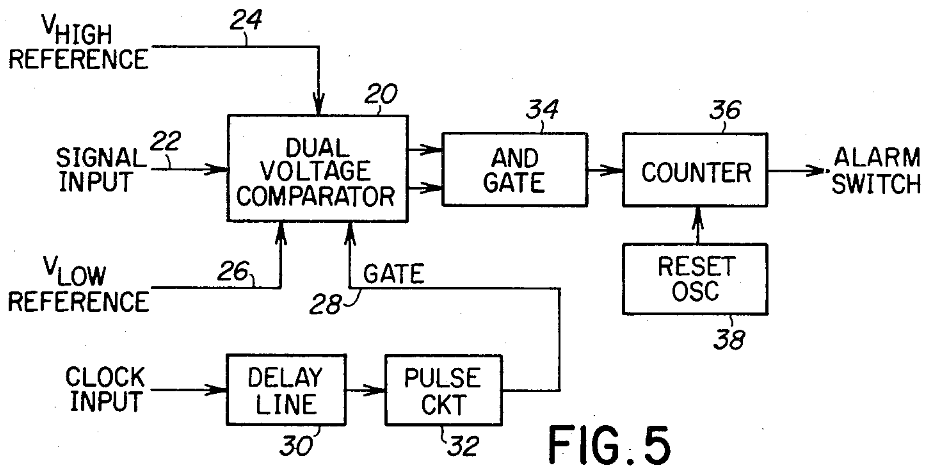
FIG. 5 is a functional block diagram of a data transmission degradation detector in accordance with the present invention.

With the concept in mind that errors in transmitted data are defined by the window within the eye pattern of the transmitted signal, consider now one implementation of a detector in accordance with the invention. With reference to FIG. 5, a dual voltage comparator 20 receives the eye pattern signal input at terminal 22, the high voltage reference, $V_{high}$, at terminal 24, and the low reference voltage, $V_{low}$, at terminal 26. A gate pulse for operating the dual voltage comparator 20 is applied at terminal 28. The gate pulse is derived from a clock input operating at the frequency of the transmitted pulse data which is applied to delay line means 30 to establish the time $T_1$ as shown in FIG. 2. The delay pulse from delay line 30 is applied to a pulse circuit 32 which generates a pulse of duration $T_2 - T_1$ (with reference to FIG. 2) in response to the delayed clock input signal thereto. The pulse generated by circuit 32 is applied as the gate to the dual voltage comparator 20. Thus, when the dual voltage comparator is enabled by the gate pulse, the signal input at terminal 22 is compared against the window defined by the $V_{high}$ and $V_{low}$ during the time period of the gate pulse.

Referring back to FIGS. 3 and 4, it will be noted that a signal transgressing the defined window must be both lower in voltage than $V_{high}$ and higher in voltage than $V_{low}$. Thus, a comparison is made within voltage comparator 20 of the signal input with reference to both the $V_{high}$ and $V_{low}$ references and two outputs from comparator 20 in response to the two comparisons is applied to AND gate 34. When both inputs to AND gate 34 are present, i.e., when the signal input is lower than $V_{high}$ and higher than $V_{low}$, AND gate 34 generates an output pulse which is applied to and stored in counter 36. Since it is desired to monitor error rate or number of errors per period of time, counter 36 is periodically reset by reset oscillator 38. In response to an error rate exceeding a predetermined limit, counter 36 actuates alarm or switch means.

Figure 6:
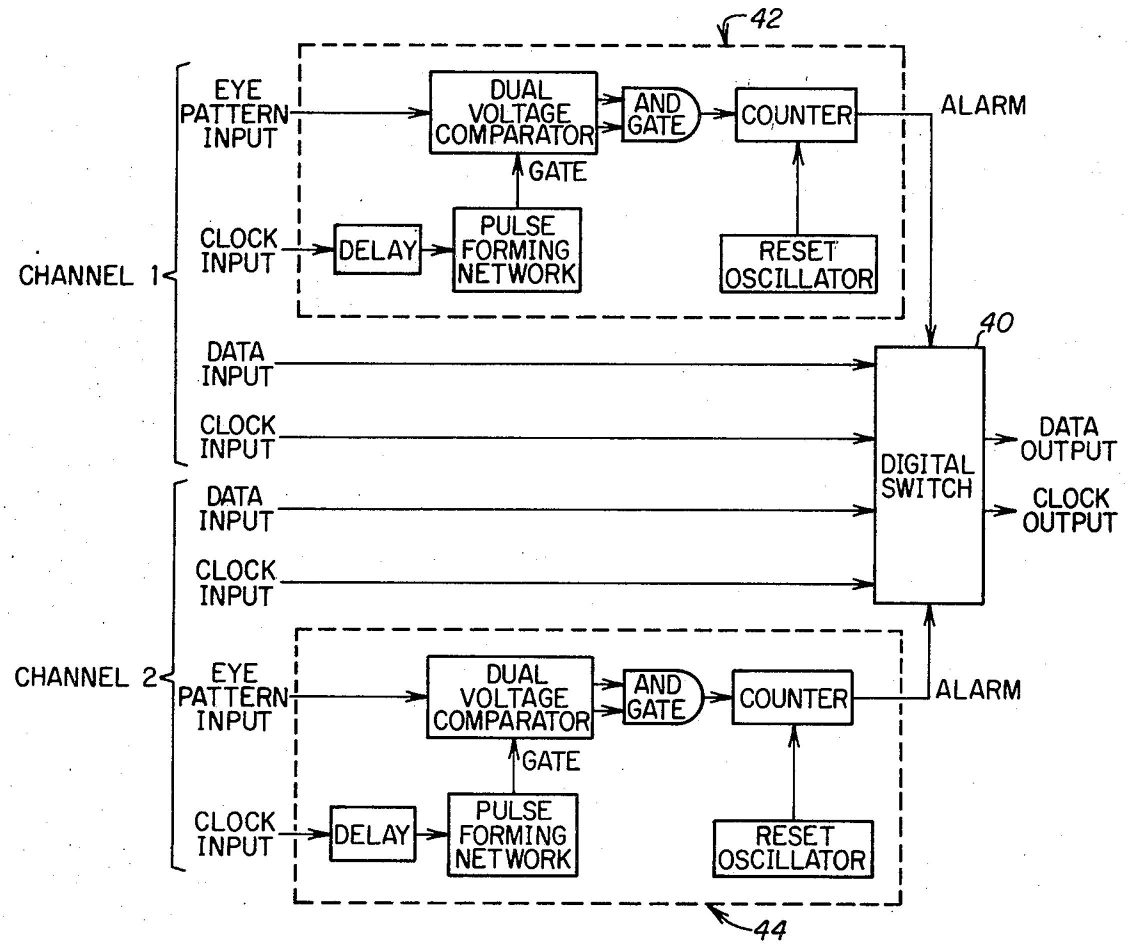
FIG. 6 is a functional block diagram of a transmission line diversity switch in accordance with the present invention.

The described degradation detector is especially useful in a diversity switch. As shown in FIG. 6, two diversity transmission channels are provided for receiving data. The respective data inputs and clock inputs for the two channels are applied to a digital switch 40 which may apply either channel to the output or receiving station. The eye pattern input for each channel is also applied to a degradation detector such as described with reference to FIG. 5 which controls operation of the digital switch 40. Assume, for example, that channel 1 is connected through digital switch to the receiving station. The degradation detector shown generally at 42 monitors the error rate for channel 1, and so long as the error rate remains within the prescribed limit, the receiving station is connected to receive data through channel 1. Should the error rate exceed the prescribed limit, then the output from degradation detector 42 causes digital switch 40 to switch to diversity channel 2. A degradation detector 44 is similarly connected to receive the eye pattern input and clock input from channel 2 and is operably connected with digital switch 40. Thus, the two channels are connected through the digital switch 40 in cooperation with the two degradation detectors to provide a diversity transmission system.

In one particular embodiment in which the data rate is 20 megabits per second and with the acceptable error rate established as $8 \times 10^{-8}$ errors per second, the degradation detector utilizes a 16 bit counter which is reset every one-tenth second. The dual voltage comparator is a Motorola MC1650 comparator and the gate used is a Motorola MC1023 gate. The window for the eye pattern is defined as ± 1 volt in height and 10 nanoseconds in width.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

I claim:

1. A data transmission degradation detector for detecting the error rate in transmitted digital data comprising a dual voltage comparator for receiving an eye pattern analog signal of said transmitted data and comparing said analog signal with a high voltage reference and a low voltage, enabling means for enabling said comparator, said comparator being responsive to said analog signal lying between said voltage references when enabled and producing a signal indicative of an error, counter means connected to said comparator for receiving said error signal, and timing means for periodically resetting said counter means.

2. A data transmission degradation detector as defined by claim 1 wherein said enabling means comprises delay means for receiving and delaying a clock signal at the frequency of said transmitted data, and pulse forming means connected to receive said delayed clock signal and generating an enabling pulse for said comparator.

3. A data transmission degradation detector as defined by claim 2 wherein said signal indicative of an error includes two outputs corresponding to comparisons of said analog signal with said high voltage reference and with said low voltage reference, and said counter means includes AND gate means for receiving said two outputs and providing an output error count.

4. A data transmission degradation detector as defined by claim 3 and further including alarm means operably connected to said counter means and responsive to a count exceeding a preselected limit.

5. A data transmission degradation detector as defined by claim 1 and further including alarm means operably connected to said counter means and responsive to a count exceeding a preselected limit.

6. A diversity switch for switching a plurality of data transmission lines in response to error rate within said transmission lines comprising switch means for receiving each of said plurality of data transmission lines, a plurality of control lines operably connected with said switch means, each of said control lines connected with an error rate detector means for monitoring the error rate within a transmission line and producing a disabling signal for said switch means when the error rate exceeds a preselected maximum, said error rate detector means including a dual voltage comparator for receiving an eye pattern analog signal of said transmitted data and comparing said analog signal with a high voltage reference and a low voltage, enabling means for enabling said comparator, said comparator being responsive to said analog signal lying between said voltage references when enabled and producing a signal indicative of an error, counter means connected to said comparator for receiving said error signal, and timing means for periodically resetting said counter means.

7. A diversity switch as defined by claim 6 wherein said enabling means comprises delay means for receiving and delaying a clock signal at the frequency of said transmitted data, and pulse forming means connected to receive said delayed clock signal and generating an enabling pulse for said comparator.

8. A diversity switch as defined by claim 7 wherein said signal indicative of an error includes two outputs corresponding to comparisons of said analog signal with said high voltage reference and with said low voltage reference, and said counter means includes AND gate means for receiving said two outputs and providing an output error count.

9. The method of detecting data transmission degradation comprising the steps of developing an eye pattern analog signal of said transmitted data, defining by a high voltage reference and a low voltage reference a region within said eye pattern as an unacceptable area through which said eye pattern may not transgress, and counting as an erroneous signal each transgression of said analog signal into said region by comparing said analog signal with said high voltage reference and said low voltage reference during a limited time period within the period of said eye pattern.

* * * * *